United States Patent
Shen et al.

(10) Patent No.: US 9,235,058 B2
(45) Date of Patent: Jan. 12, 2016

(54) POLARIZATION-TYPE THREE-DIMENSIONAL DISPLAY DEVICE AND MANUFACTURING METHOD THEREOF

(71) Applicants: BOE TECHNOLOGY GROUP CO., LTD., Beijing (CN); HEFEI BOE OPTOELECTRONICS TECHNOLOGY CO., LTD., Hefei, Anhui (CN)

(72) Inventors: Ying Shen, Beijing (CN); Yongjun Yoon, Beijing (CN); Zhizhong Tu, Beijing (CN)

(73) Assignees: BOE TECHNOLOGY GROUP CO., LTD, Beijing (CN); HEFEI BOE OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 0 days.

(21) Appl. No.: 14/408,669

(22) PCT Filed: Apr. 21, 2014

(86) PCT No.: PCT/CN2014/075827
§ 371 (c)(1),
(2) Date: Dec. 17, 2014

(87) PCT Pub. No.: WO2015/096313
PCT Pub. Date: Jul. 2, 2015

(65) Prior Publication Data
US 2015/0309322 A1 Oct. 29, 2015

(30) Foreign Application Priority Data
Dec. 27, 2013 (CN) .......................... 2013 1 0738708

(51) Int. Cl.
*G02F 1/1335* (2006.01)
*G02B 27/26* (2006.01)

(52) U.S. Cl.
CPC .......... *G02B 27/26* (2013.01); *G02F 1/133512* (2013.01); *G02F 1/133528* (2013.01)

(58) Field of Classification Search
CPC .................... G02F 1/133512; G02F 1/133528; G02B 27/26
See application file for complete search history.

(56) References Cited

U.S. PATENT DOCUMENTS

2012/0162580 A1  6/2012  Wu
2012/0262638 A1* 10/2012  Chen ...................... G02B 5/201
349/15

(Continued)

FOREIGN PATENT DOCUMENTS

CN  102023401 A  4/2011
CN  201886250 U  6/2011

(Continued)

OTHER PUBLICATIONS

Chinese Office Action of Chinese Application No. 201310738708.2, mailed May 6, 2015 with English translation.

(Continued)

*Primary Examiner* — James Dudek
(74) *Attorney, Agent, or Firm* — Collard & Roe, P.C.

(57) ABSTRACT

A polarization three-dimensional display and method comprise a liquid crystal panel, with an array substrate and a color filter substrate opposing each other, the color filter substrate including a plurality of black matrix strips disposed on a side of it facing the array substrate; and a liquid crystal layer; a phase difference structure, located on a light-exiting side of the panel, a plurality of patterned phase difference diaphragms are arranged on the phase difference structure; a plurality of light-shielding strips, disposed on a side of the array substrate away from the liquid crystal layer, projections of the plurality of light-shielding strips on the phase difference structure cover boundary lines of the patterned phase difference diaphragms on the phase difference structure, and projections of the plurality of black matrix strips on the phase difference structure cover boundary lines of the patterned phase difference diaphragms on the phase difference structure.

10 Claims, 3 Drawing Sheets

(56) References Cited

U.S. PATENT DOCUMENTS

| | | |
|---|---|---|
| 2013/0141552 A1 | 6/2013 | Kwon |
| 2013/0155505 A1 | 6/2013 | Kim et al. |
| 2013/0314781 A1 | 11/2013 | Jang et al. |

FOREIGN PATENT DOCUMENTS

| | | |
|---|---|---|
| CN | 102468243 A | 5/2012 |
| CN | 102645753 A | 8/2012 |
| CN | 103135241 A | 6/2013 |
| CN | 103424919 A | 12/2013 |
| CN | 103698894 A | 4/2014 |
| CN | 203673154 U | 6/2014 |
| GB | 2497621 A | 6/2013 |

OTHER PUBLICATIONS

Written Opinion of the International Searching Authority of PCT/CN2014/075827 with English Translation, mailed Sep. 3, 2014.
International Search Report, International Preliminary Report on Patentability and Written Opinion of the International Searching Authority of PCT/ in Chinese, mailed.

* cited by examiner

POLARIZATION-TYPE THREE-DIMENSIONAL DISPLAY DEVICE AND MANUFACTURING METHOD THEREOF

CROSS REFERENCE TO RELATED APPLICATIONS

This application is the National Stage of PCT/CN2014/075827 filed on Apr. 21, 2014, which claims priority under 35 U.S.C. §119 of Chinese Application No. 201310738708.2 filed on Dec. 27, 2013, the disclosure of which is incorporated by reference.

TECHNICAL FIELD

Embodiments of the present invention relate to a polarization-type three-dimensional display device and a manufacturing method thereof.

BACKGROUND

As shown in FIG. 1, the construction of a polarization-type three dimensional (3D) display device with a phase different structure sequentially comprises from left to right a Back Light Unit (BLU) 101, a first Polarizer (POL) 102, a Thin Film Transistor array substrate 103, a Color Filter substrate 104, a second polarizer 105 and the phase difference structure 106. Herein, liquid crystal (not shown in FIG. 1) is filled between the array substrate 103 and the color filter substrate 104. A plurality of patterned phase difference diaphragms 107 are arranged on the phase difference structure 106, and a plurality of black matrix strips 108 are disposed on a side of the color filter substrate 104 close to the array substrate 103. Orthographic projections of black matrix strips 108 on the phase difference structure 106 cover boundary lines of patterned phase difference diaphragms 107 on the phase difference structure 106 in a one-to-one corresponding relationship, and a region between two adjacent boundary lines of the patterned phase difference diaphragms 107 on the color filter substrate 104 is one pixel region. Generally, a vertical viewing angle of the polarization-type three-dimensional display device with the phase difference structure may be determined by a formula B=arc sin (refractive index×sin A), the refractive index may take an empirical value of 1.5, and the angle A is the maximum vertical light-transmissive angle of one pixel region upon 3D display that is determined in accordance with the principle of no optical interference occurring between adjacent pixels. Generally, beyond the vertical viewing angle, an optical interference will occur between adjacent pixels and the image quality is adversely affected. Therefore, the vertical viewing angle of the polarization-type three-dimensional display device is 'bigger is better'. As can be seen on the basis of the determining formula of the vertical viewing angle, the larger the angle A is, the larger the vertical viewing angle of the polarization-type three-dimensional display device with the phase difference structure is. According to the principle of no optical interference occurring between adjacent pixels, two sides of the angle A of the polarization-type three-dimensional display device in FIG. 1 can be determined to be ab and cd in FIG. 2. A determining method of ab and cd in FIG. 2 is that, intersection points a, c between corresponding sides of two black matrix strips 108 (in an actual application, as a thickness of black matrix strips 108 is smaller, it is negligible) at boundaries of each pixel region that are close to a center of the pixel region and a plane perpendicular to the sides (FIG. 2 is a sectional view, and then, the plane perpendicular to the sides may be a plane perpendicular to a paper plane) are firstly determined; intersection points b, d between boundary lines of patterned phase difference diaphragms 107 covered by the orthographic projections of the black matrix strips 108 on the phase difference structure 106 and the same plane are then determined; a and b as well as c and d are connected, so that two sides of the angle A can be determined. As such, based on the construction of a current polarization-type three-dimensional display device, it can be obtained that $\angle A=2\,(\angle A/2)$, $\angle A/2=\arc\tan((h/2)/D)$, wherein, h is a width of the black matrix strip 108, and D is the sum of thickness of the color filter substrate 104 and the second polarizer 105. Thus, $\angle A=2 \arc\tan(h/2D)$. When $\angle A/2$ is calculated, a distance between the second polarizer 105 and the phase difference structure 106 is not taken into consideration, and this is because that in an actual application, the distance between the second polarizer 105 and the phase difference structure 106 is very small, and it can be neglected.

In order to ensure the aperture ratio of each pixel, the width of the black matrix strip 108 cannot be too large. While it is also very difficult for the thicknesses of the color filter substrate 104 and the second polarizer 105 to be made to be more small, and thus, it is also very difficult for the polarization-type three-dimensional display device shown in FIG. 1 to have a relatively large vertical viewing angle.

SUMMARY

According to embodiments of the present invention, there are provided a polarization-type three-dimensional display device and a manufacturing method thereof, capable of increasing the vertical viewing angle of the polarization-type three-dimensional display device.

In an aspect, according to an embodiment of the invention, there is provided a polarization-type three-dimensional display device, comprising: a liquid crystal panel, comprising: an array substrate and a color filter substrate disposed opposite to each other, the color filter substrate including a plurality of black matrix strips disposed on a side of it facing the array substrate; and a liquid crystal layer, located between the array substrate and the color filter substrate; a phase difference structure, located on a light-exiting side of the liquid crystal panel, wherein a plurality of patterned phase difference diaphragms are arranged on the phase difference structure; a plurality of light-shielding strips, disposed on a side of the array substrate far away from the liquid crystal layer, wherein, orthographic projections of the plurality of light-shielding strips on the phase difference structure cover boundary lines of the patterned phase difference diaphragms on the phase difference structure, and orthographic projections of the plurality of black matrix strips on the phase difference structure cover the boundary lines of the patterned phase difference diaphragms on the phase difference structure.

In another aspect, according to an embodiment of the invention, there is provided a manufacturing method of a polarization-type three-dimensional display device, comprising: fabricating an array substrate and a color filter substrate; producing a plurality of light-shielding strips on a side of the array substrate, and producing a plurality of black matrix strips on a side of the color filter substrate; cell-assembling the array substrate and the color filter substrate with a liquid crystal layer formed therebetween, so as to form a liquid crystal cell, wherein the plurality of light-shielding strips are located on a side of the array substrate far away from the liquid crystal layer, the plurality of black matrix strips are disposed on a side of the color filter substrate facing the array substrate; attaching a phase difference structure to a side of the color filter substrate far away from the array substrate, with a plurality of patterned phase difference diaphragms being arranged on the phase difference structure, wherein orthographic projections of the plurality of light-shielding strips on the phase difference structure cover boundary lines of the patterned phase difference diaphragms on the phase difference structure, orthographic projections of the plurality of black matrix strips on the phase difference structure cover boundary lines of the patterned phase difference diaphragms on the phase difference structure.

BRIEF DESCRIPTION OF THE DRAWINGS

In order to illustrate the technical solution of the embodiments of the invention more clearly, the drawings of the embodiments will be briefly described below; it is obvious that the drawings as described below are only related to some embodiments of the invention, but not limitative of the invention.

DETAILED DESCRIPTION

In order to make objects, technical details and advantages of the embodiments of the invention apparent, hereinafter, the technical solutions of the embodiments of the invention will be described in a clearly and fully understandable way in connection with the drawings related to the embodiments of the invention. It is obvious that the described embodiments are just a part but not all of the embodiments of the invention. Based on the described embodiments of the invention, those ordinarily skilled in the art can obtain other embodiment(s), without any inventive work, which should be within the scope sought for protection by the invention.

With respect to a polarization-type three-dimensional display device and a manufacturing method thereof provided by embodiments of the invention, a plurality of light-shielding strips are disposed on a side of an array substrate facing a first polarizer, and a plurality of black matrix strips are disposed on a side of a color filter substrate facing the array substrate, wherein, orthographic projections of the plurality of light-shielding strips and the plurality of black matrix strips on a phase difference structure cover boundary lines of patterned phase difference diaphragms on the phase difference structure. Under the action of shielding of the light-shielding strips and the black matrix strips, a viewing angle at which no optical interference occurs between adjacent pixels of the polarization-type three-dimensional display device is increased while the aperture ratio is guaranteed. In turn, a vertical viewing angle of the polarization-type three-dimensional display device is increased.

Figure 3A:
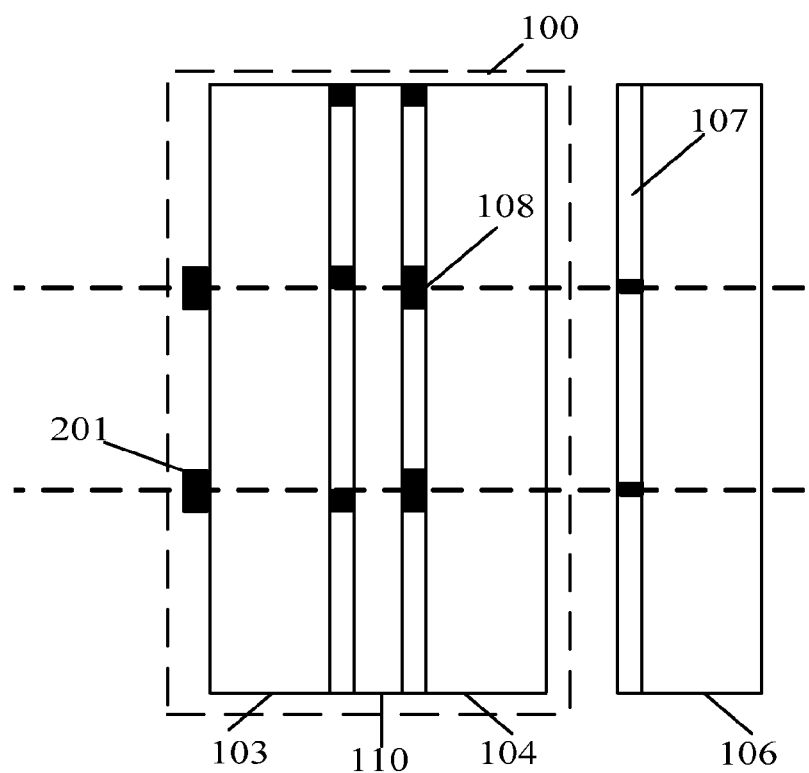
FIG. 3a is a structurally schematic view 1 illustrating a polarization-type three-dimensional display device provided by an embodiment of the invention.

As shown in FIG. 3a, a polarization-type three-dimensional display device provided by an embodiment of the invention comprises:

a liquid crystal panel 100 and a phase difference structure 106 located on a light-exiting side of the liquid crystal panel 100, wherein, the liquid crystal panel 100 comprises an array substrate 103 and a color filter substrate 104 disposed in opposition to each other, and a liquid crystal layer 110 interposed between the array substrate 103 and the color filter substrate 104, a plurality of patterned phase difference diaphragms 107 are arranged on the phase difference structure 106.

Herein, a plurality of light-shielding strips 201 are disposed on a side of the array substrate 103 far away from the liquid crystal layer, and orthographic projections of the plurality of light-shielding strips 201 on the phase difference structure 106 cover boundary lines of the patterned phase difference diaphragms 107 on the phase difference structure 106; a plurality of black matrix strips 108 are disposed on a side of the color filter substrate 104 facing the array substrate 103, and orthographic projections of the plurality of black matrix strips 108 on the phase difference structure 106 cover boundary lines of patterned phase difference diaphragms 107 on the phase difference structure 106.

The light-shielding strips 201 are disposed on a side of the array substrate 103 facing a first polarizer 102, a plurality of black matrix strips 108 are disposed on a side of the color filter substrate 104 facing the array substrate 103, and orthographic projections of the plurality of light-shielding strips 201 and the plurality of black matrix strips 108 on the phase difference structure 106 cover boundary lines of the patterned phase difference diaphragms 107 on the phase difference structure 106. Under the combined action of shielding of the light-shielding strips 201 and the black matrix strips 108, a viewing angle at which no optical interference occurs between adjacent pixels of the polarization-type three-dimensional display device is increased, and furthermore, aperture ratio of each pixel can be guaranteed.

According to an embodiment of the invention, there is provided a polarization-type three-dimensional display device, capable of increasing a vertical viewing angle of the polarization-type three-dimensional display device.

Figure 3B:
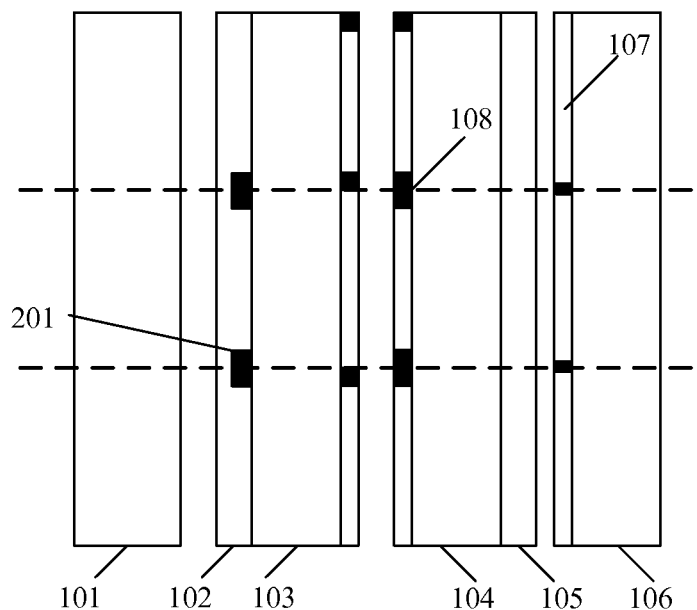
FIG. 3b is a structurally schematic view 2 illustrating a polarization-type three-dimensional display device provided by an embodiment of the invention.

As shown in FIG. 3b, the polarization-type three-dimensional display device provided by the embodiment of the invention comprises: a backlight source 101, a first polarizer 102 located over the backlight source 101, an array substrate 103 located over the first polarizer 102, a color filter substrate 104 located over the array substrate 103, a second polarizer 105 located on the color filter substrate 104 and a phase difference structure 106 located over the second polarizer 105 and a plurality of patterned phase difference diaphragms 107 being arranged on the phase difference structure 106, wherein a plurality of light-shielding strips 201 are disposed on a side of the array substrate 103 facing the first polarizer 102, and orthographic projections of the plurality of light-shielding strips 201 on the phase difference structure 106 cover boundary lines of the patterned phase difference diaphragms 107 on the phase difference structure 106; and a plurality of black matrix strips 108 are disposed on a side of the color filter substrate 104 facing the array substrate 103, and orthographic projections of the plurality of black matrix strips 108 on the phase difference structure 106 cover boundary lines of the patterned phase difference diaphragms 107 on the phase difference structure 106.

The light-shielding strips 201 are disposed on a side of the array substrate 103 facing the first polarizer 102, the plurality of black matrix strips 108 are disposed on a side of the color filter substrate 104 facing the array substrate 103, and orthographic projections of the plurality of light-shielding strips 201 and the plurality of black matrix strips 108 on the phase difference structure 106 cover boundary lines of the patterned phase difference diaphragms 107 on the phase difference structure 106. Under the action of shielding of the light-shielding strips 201 and the black matrix strips 108, a viewing angle at which no optical interference occurs between adjacent pixels of the polarization-type three-dimensional display device is increased, and furthermore, the aperture ratio of each pixel can be guaranteed.

Exemplarily, in the case that a larger aperture ratio is required, projections of the light-shielding strips 201 on the phase difference structure 106 may be covered by projections of the black matrix strips 108 on the phase difference structure 106.

Exemplarily, orthographic projections of the light-shielding strip 201 and the black matrix strip 108 on the phase difference structure 106 may coincide, so that the maximum vertical viewing angle can be achieved while the aperture ratio can be guaranteed.

In practical applications, in order to simplify the manufacturing process, it is possible to let the light-shielding strips 201 and the black matrix strips 108 have the same size and shape.

Of course, those skilled in the art may adopt other feasible ways to set the light-shielding strips 201 as well, only one exemplary implementation is provided here, and they will not be described any more one by one.

In practical applications, material for the light-shielding strips 201 may be metal or an acrylic polymer. Exemplarily, metal may be selected for production of the light-shielding strips 201, so as to reduce the resistivity of the whole back face of the array substrate 103, and serve a better function of electrostatic shielding, and furthermore, the flatness of surface for the light-shielding strip 201 made of the metal is better than the flatness of surface for the light-shielding strip 201 made of the acrylic polymer.

Of course, those skilled in the art may adopt other available light-shielding materials to make the light-shielding strips 201, only one exemplary material is provided here, and they will not be described any more one by one.

Further, in order to make the vertical viewing angle of each pixel uniform, it is possible to let the light-shielding strips 201 have the same shape. Further, it is possible to let the orthographic projection of the light-shielding strip 201 on the phase difference structure 106 be symmetric with a boundary line of the patterned phase difference diaphragms 107 that is covered by it, so that the vertical viewing angle of each pixel is uniform.

Further, it is also possible to let the orthographic projection of the black matrix strip 108 on the phase difference structure 106 be symmetric with a boundary line of the patterned phase difference diaphragms that is covered by it. Thereby, this facilitates settings of the polarization-type three-dimensional display device, and it is easier to make the vertical viewing angle of each pixel of the polarization-type three-dimensional display device be more uniform.

In order to simplify the manufacturing process, it is possible to dispose the light-shielding strips 201 on a side of a base substrate of the array substrate 103 facing the first polarizer 102.

Figure 4:
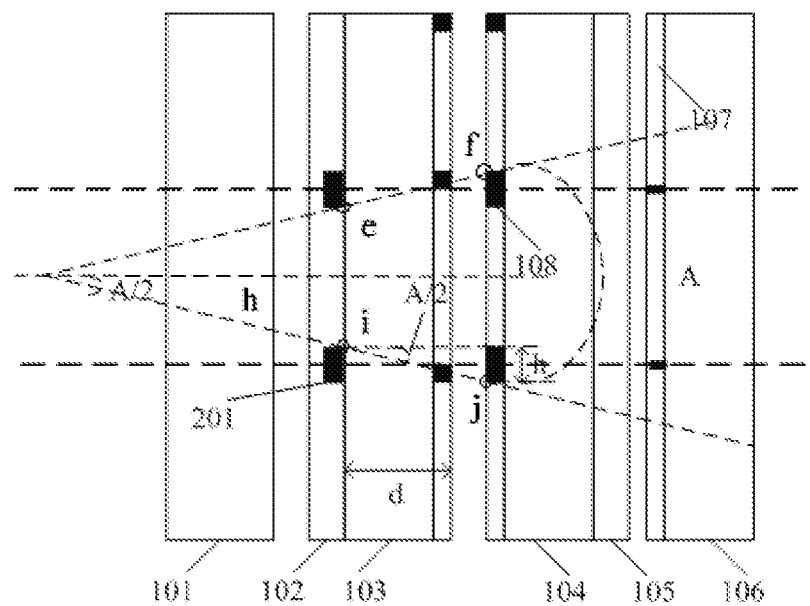
FIG. 4 is a structurally schematic view illustrating another polarization-type three-dimensional display device provided by an embodiment of the invention.

Optionally, according to an embodiment of the invention, there is provided a polarization-type three-dimensional display device, as shown in FIG. 4, which comprises a backlight source 101, a first polarizer 102 located over the backlight source 101, an array substrate 103 located over the first polarizer 102, a color filter substrate 104 located over the array substrate 103, a second polarizer 105 located over the color filter substrate 104 and a phase difference structure 106 located over the second polarizer 105, wherein a plurality of light-shielding strips 201 are disposed on a side of the array substrate 103 facing the first polarizer 102, and orthographic projections of the plurality of light-shielding strips 201 on the phase difference structure 106 cover boundary lines of the patterned phase difference diaphragms 107 on the phase difference structure 106; a plurality of black matrix strips 108 are disposed on a side of the color filter substrate 104 facing the array substrate 103, and orthographic projections of the plurality of black matrix strips 108 on the phase difference structure 106 cover boundary lines of the patterned phase difference diaphragms 107 on the phase difference structure 106; and orthographic projections of the light-shielding strip 201 and the black matrix strip 108 on the phase difference structure 106 coincide, and each of the light-shielding strips 201 and the black matrix strips 108 is symmetric with the boundary line of the patterned phase difference diaphragms 107 covered by it, and material for the light-shielding strip 201 is metal.

Figure 1:
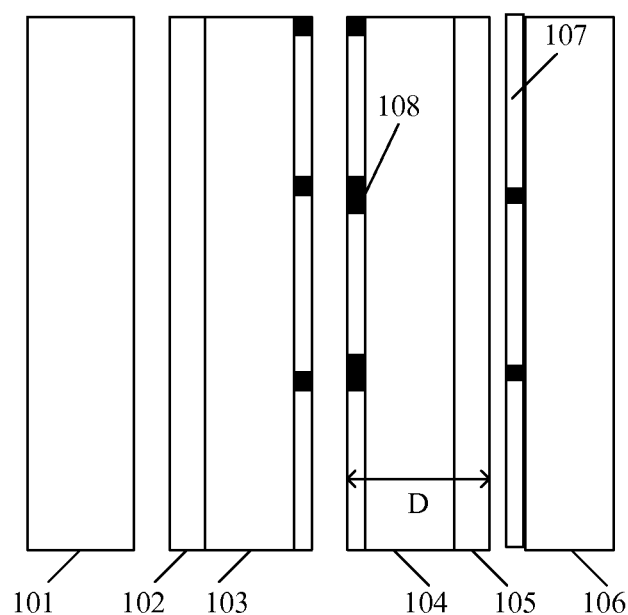
FIG. 1 is a structurally sectional view illustrating a current polarization-type three-dimensional display device.
Figure 2:
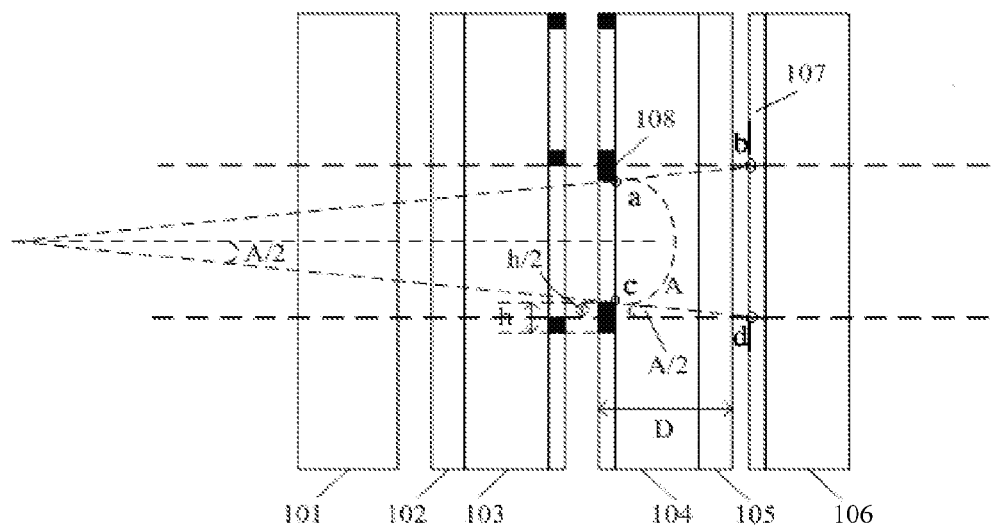
FIG. 2 is a schematic view illustrating an angle A of a current polarization-type three-dimensional display device.

The vertical viewing angle of the polarization-type three-dimensional display device shown in FIG. 4 can also be determined by a formula B=arc sin (refractive index×sin A), the refractive index may take an empirical value of 1.5. In this case, two sides of the maximum vertical light-transmissive angle for each pixel region upon three-dimensional display determined according to the principle of no optical interference occurring between adjacent pixels are ef and ij in FIG. 4. A determining method of ef and ij in FIG. 4 is that, intersection points e, i between corresponding sides of two light-shielding strips 201 (in an actual application, in order not to increase a thickness of the display device, a thickness of the light-shielding strip 201 has to be set to be very small, so it is negligible) at the boundaries of each pixel region that are close to a center of the pixel region and a plane perpendicular to the sides (FIG. 4 is a sectional view, and then, the plane perpendicular to the sides may be a plane perpendicular to a paper plane) are firstly determined; intersection points f, j between corresponding sides close to the center of the same pixel region for the black matrix strips 108 (in an actual application, thickness of the black matrix strips 108 are smaller, and therefore it is negligible), orthographic projections on the phase difference structure 106 of which coincide with those of the light-shielding strips 201, and the same plane are then determined; e and f as well as i and j are connected, so that two sides of the angle A can be determined. In FIG. 4, as a width of the black matrix strip 108 is relatively small, shielding from light provided by them will not affect the display effect of the liquid crystal display device. It can be obtained from this that $\angle A=2\,(\angle A/2)$, $\angle A/2=\arctan((h/d)$, wherein, h is a length of a orthographic projection of each black matrix strip 108 on the color filter substrate 104 in a direction perpendicular to a pixel boundary line covered by the black matrix strip 108, namely, a width of each black matrix strip 108, and d is a thickness of the array substrate 103 in a direction perpendicular to a connecting face between the array substrate 103 and the first polarizer 102, then $\angle A=2\,\arctan(h/d)$. Generally, D is equal to the thickness of the color filter substrate 104, and thus, d<D, 2 arc tan (h/d)>2 arc tan (h/D)>2 arc tan (h/2D). The vertical viewing angle of the polarization-type three-dimensional display device in FIG. 4 is larger than the vertical viewing angle of the polarization-type three-dimensional display device in FIG. 1. Because thicknesses of the array substrate 103 and the color filter substrate 104 are both in millimeter-scale, the angle A in FIG. 4 may be increased by about 12 degrees relative to the angle A in FIG. 1.

The wider the width of the light-shielding strip 201 in a direction perpendicular to an interface of the phase difference structure 106 (namely, the width of the light-shielding strip 201) is, the larger the vertical viewing angle of the polarization-type three-dimensional display device is. However, if the width of the light-shielding strip 201 in the direction perpendicular to the interface of the phase difference structure 106 is wide excessively, the aperture ratio of each pixel may be adversely affected. Therefore, in order to achieve increasing of the vertical viewing angle of a polarization-type three-dimensional display device to the maximum degree while reduction in the aperture ratio of each pixel resulting from arrangement of light-shielding strips 201 is avoided, it is possible to let orthographic projections of the light-shielding strip 201 and the black matrix strip 108 on the phase difference structure 106 coincide.

With respect to a polarization-type three-dimensional display device provided by embodiments of the invention, light-shielding strips are disposed on a side of an array substrate facing a first polarizer, a plurality of black matrix strips are disposed on a side of a color filter substrate facing the array substrate, and orthographic projections of the plurality of light-shielding strips and the plurality of black matrix strips on a phase difference structure are made to cover boundary lines of patterned phase difference diaphragms on the phase difference structure. Under the action of shielding of the light-shielding strips and the black matrix strips, it allows 2 arc tan (h/d)>2 arc tan (h/D)>2 arc tan (h/2D). Thereby, a viewing angle at which no optical interference occurs between adjacent pixels of the polarization-type three-dimensional display device is increased while the aperture ratio is guaranteed. In turn, a vertical viewing angle of the polarization-type three-dimensional display device is increased.

In another aspect, according to an embodiment of the invention, there is further provided a manufacturing method of a polarization-type three-dimensional display device, comprising:

S501, an array substrate, and a color filter substrate are prepared;

S502, a plurality of light-shielding strips are produced on a side of the array substrate, and a plurality of black matrix strips are produced on a side of the color filter substrate;

S503, the array substrate and the color filter substrate are cell-assembled and a liquid crystal layer is formed between the array substrate and the color filter substrate, so as to form a liquid crystal cell, wherein the plurality of light-shielding strips are located on a side of the array substrate far away from the liquid crystal layer, the plurality of black matrix strips are disposed on a side of the color filter substrate facing the array substrate; a phase difference structure is attached to a side of the color filter substrate far away from the array substrate, a plurality of patterned phase difference diaphragms are arranged on the phase difference structure, wherein, orthographic projections of the plurality of light-shielding strips on the phase difference structure cover boundary lines of the patterned phase difference diaphragms on the phase difference structure, orthographic projections of the plurality of black matrix strips on the phase difference structure cover boundary lines of the patterned phase difference diaphragms on the phase difference structure.

Exemplarily, material for the light-shielding strips 201 may be metal or an acrylic polymer. Of course, those skilled in the art may adopt other available light-shielding materials to make the light-shielding strips 201, and they will not be described any more one by one.

Exemplarily, when the material of the fabricated light-shielding strips 201 is metal, in S502, producing the plurality of light-shielding strips on the side of the array substrate facing the first polarizer comprises:

S601, a metal film is formed on a base substrate of the array substrate, such as, on a side of a glass substrate far away from the liquid crystal layer;

S602, a plurality of metal light-shielding strips are formed by performing exposure, development, etching and stripping to the metal film.

Exemplarily, it is possible that by means of bombarding a metal target with gaseous ions accelerated by an electric field, a metal film-forming material is transferred from the target to the base substrate for implementing physical film formation; and further, through photoresist coating, exposure, development, etching, stripping and other processes, the metal film is made into metal light-shielding strips 201.

Of course, those skilled in the art may adopt other feasible ways to produce the plurality of light-shielding strips 201 on the side of the array substrate 103 facing the first polarizer 102, only one exemplary method is provided here, and they will not be described any more one by one.

In S502, producing the plurality of black matrix strips on the side of the color filter substrate facing the array substrate may be implemented by using common ways, and they will not be described any more one by one.

With respect to a polarization-type three-dimensional display device and a manufacturing method thereof provided by embodiments of the invention, a plurality of light-shielding strips are disposed on a side of an array substrate facing a first polarizer, and a plurality of black matrix strips are disposed on a side of a color filter substrate facing the array substrate, wherein, orthographic projections of the plurality of light-shielding strips and the plurality of black matrix strips on a phase difference structure cover boundary lines of patterned phase difference diaphragms on the phase difference structure. Under the action of shielding of the light-shielding strips and the black matrix strips, a viewing angle at which no optical interference occurs between adjacent pixels of the polarization-type three-dimensional display device is increased while the aperture ratio is guaranteed. In turn, a vertical viewing angle of the polarization-type three-dimensional display device is increased.

Obviously, those skilled in the art can make various modifications and variants of the invention without departing from the spirit and scope of the invention. As such, provided that these modifications and variants of the invention fall into the scope of claims of the invention and equivalent technologies thereof, it is also intended for the invention to embrace them therein.

The present application claims priority of China patent application No. 201310738708.2 filed on Dec. 27, 2013, which is incorporated herein by reference in its entirety.

The invention claimed is:

1. A polarization-type three-dimensional display device, comprising:
   a liquid crystal panel, comprising:
      an array substrate and a color filter substrate disposed opposite to each other, the color filter substrate comprising a plurality of black matrix strips disposed on a side of it facing the array substrate; and
      a liquid crystal layer, located between the array substrate and the color filter substrate;
   a phase difference structure, located on a light-exiting side of the liquid crystal panel, wherein a plurality of patterned phase difference diaphragms are arranged on the phase difference structure;
   a plurality of light-shielding strips, disposed on a side of the array substrate far away from the liquid crystal layer, wherein, orthographic projections of the plurality of light-shielding strips on the phase difference structure cover boundary lines of the patterned phase difference diaphragms on the phase difference structure, and orthographic projections of the plurality of black matrix strips on the phase difference structure cover the boundary lines of the patterned phase difference diaphragms on the phase difference structure.

2. The polarization-type three-dimensional display device claimed as claim 1, wherein the projection of each of the light-shielding strips on the phase difference structure is covered by the projection of the black matrix strip on the phase difference structure.

3. The polarization-type three-dimensional display device claimed as claim 2, wherein the projection of each of the light-shielding strips on the phase difference structure coincides with the projection of the black matrix strip on the phase difference structure.

4. The polarization-type three-dimensional display device claimed as claim 3, wherein each of the light-shielding strips and each of the black matrix strips have the same size and shape.

5. The polarization-type three-dimensional display device claimed as claim 1, wherein material for the light-shielding strips is metal or an acrylic polymer.

6. The polarization-type three-dimensional display device claimed as claim 1, wherein the orthographic projection of each of the light-shielding strips on the phase difference structure is symmetric with a boundary line covered by it of the patterned phase difference diaphragm.

7. The polarization-type three-dimensional display device claimed as claim 1, further comprising a first polarizer that is disposed on a side of the array substrate far away from the liquid crystal layer, wherein each of the light-shielding strips is disposed on a side of a base substrate of the array substrate facing the first polarizer.

8. The polarization-type three-dimensional display device claimed as claim 1, wherein the orthographic projection of each of the black matrix strips on the phase difference structure is symmetric with a boundary line covered by it of the patterned phase difference diaphragm.

9. A manufacturing method of a polarization-type three-dimensional display device, comprising:

fabricating an array substrate and a color filter substrate;

producing a plurality of light-shielding strips on a side of the array substrate, and producing a plurality of black matrix strips on a side of the color filter substrate;

cell-assembling the array substrate and the color filter substrate with a liquid crystal layer formed therebetween, so as to form a liquid crystal cell, wherein the plurality of light-shielding strips are located on a side of the array substrate far away from the liquid crystal layer, the plurality of black matrix strips are disposed on a side of the color filter substrate facing the array substrate;

attaching a phase difference structure to a side of the color filter substrate far away from the array substrate, with a plurality of patterned phase difference diaphragms being arranged on the phase difference structure, wherein orthographic projections of the plurality of light-shielding strips on the phase difference structure cover boundary lines of the patterned phase difference diaphragms on the phase difference structure, orthographic projections of the plurality of black matrix strips on the phase difference structure cover boundary lines of the patterned phase difference diaphragms on the phase difference structure.

10. The manufacturing method claimed as claim 9, wherein the producing a plurality of light-shielding strips on a side of the array substrate comprises:

forming a metal film on a side of a base substrate of the array substrate;

forming the plurality of light-shielding strips by performing exposure, development, etching and stripping to the metal film.

* * * * *